United States Patent [19]

Rosswurm

[11] Patent Number: 5,180,939
[45] Date of Patent: Jan. 19, 1993

[54] MECHANICALLY COMMUTATED LINEAR ALTERNATOR

[75] Inventor: Mark A. Rosswurm, Columbus, Ind.

[73] Assignee: Cummins Power Generation, Inc., Columbus, Ind.

[21] Appl. No.: 840,466

[22] Filed: Feb. 24, 1992

[51] Int. Cl.5 ............................................. H02K 35/00
[52] U.S. Cl. ......................................... 310/27; 310/15; 290/1 R
[58] Field of Search ....................... 310/15, 27; 60/520; 290/1 R

[56] References Cited

U.S. PATENT DOCUMENTS 4,649,283 3/1987 Berchowitz et al. ............... 290/1 R Primary Examiner—Skudy R.
Assistant Examiner—Judson H. Jones
Attorney, Agent, or Firm—Woodard, Emhardt, Naughton, Moriarty & McNett

[57] ABSTRACT

An improved device for generating an alternating electrical current is disclosed, employing a stationary electrical exciter coil and inductive ouptut coil, and a pair of reciprocating elements to selectively alternate between a plurality of magnetic flux field paths. The reciprocating elements each have relatively staggered magnetically permeable portions for alternatingly establishing one of the magnetic flux field paths. The alternating flux field paths, each passing through the center axis of the inductive output coil, cause the reversal of the direction of magnetic flux flow through the center axis, inducing the inductive coil to generate an alternating output current.

21 Claims, 3 Drawing Sheets

MECHANICALLY COMMUTATED LINEAR ALTERNATOR

BACKGROUND OF THE INVENTION

1. Field of the Invention

This invention relates to a linear alternator for use in generating an alternating current and more particularly to a relatively inexpensive electromagnetic device of low reciprocating mass for generating an alternating electrical current without the use of permanent magnets.

2. Description of the Prior Art

Many methods have been devised to generate an alternating current by converting mechanical energy into electrical energy via electromagnetic principles. The basic principle requires the relative motion of an electrical conductor, usually a conductive winding, with respect to a magnetic circuit to induce the flow of an electrical current in the conductive winding. Most devices employ rotational motion of an electrical conductor with respect to a multipole magnetic circuit as a means to induce an alternating electrical current. If a reciprocating member is used to provide the relative motion, significant waste and inefficiencies of translational to rotational motion conversion are experienced. Accordingly, few alternators have adopted a translating or reciprocating member to directly impart the relative motion.

Those prior art alternators that have adopted a translating or reciprocating member are generally referred to as linear alternators. Linear alternators are often used with free-piston stirling engines to extract electrical power from the reciprocating elements. In these prior art linear alternators, permanent magnets are utilized to develop a magnetic flux field which flows through the magnetic circuit. This flux field is traversed by an electrical conductor, usually in the form of an inductive coil. There are some general advantages to this approach. Linear alternators equipped with permanent magnets are physically smaller, require less volume, and tend to weigh less than alternative approaches.

However, permanent magnet linear alternators do have major disadvantages. The cost of the permanent magnets used to develop the magnetic flux field can represent up to 35 percent of the total alternator assembly cost. Also, the alternating current generated by a permanent magnet linear alternator is difficult to control precisely. This disadvantage arises from the fixed magnetic field flux (or B-field) that permanent magnets develop. As an alternative to modulating the B-field, the stroke of the linearly reciprocal member, usually affixed to the engine piston, must be adjusted to vary the induced current. Such adjustment is not always convenient.

Alternatives to permanent magnet linear alternators which eliminate the permanent magnet do exist and employ a B-field generator incorporated into the reciprocating elements to provide the required alternating magnetic flux circuit. In such applications, the alternating current generator is generally used to increase the gain of an alternating current input electrical signal. In this approach, a pickup coil is mounted on the reciprocating element to generate an AC voltage and an exciter coil is mounted on a proximate stationary element to provide power to the reciprocating field pickup coil. This AC voltage is then rectified to a DC voltage by diodes mounted on the reciprocating element. The DC voltage, in turn, generates a B-field through a field coil mounted on the reciprocating element. A stationary inductive coil mounted within this B-field then produces an alternating current.

A major disadvantage of this approach to linear alternators is that the reciprocating element must include the field pickup coil, the diode assembly, and the field coil. These elements, especially the field coil, significantly increase the mass of the reciprocating element. In addition to higher inertial loads, the additional mass must be compensated for by the use of larger stirling engine pneumatic bounce springs. In the case of a free-piston stirling engine (a common motive source of linear alternators), larger pneumatic bounce springs tend to reduce mechanical efficiency. The additional mass of the components also tends to increase the complexity of the reciprocating element, which must function within extremely tight tolerances to reduce gas leakage.

SUMMARY OF THE INVENTION

The linear alternator of the present invention obtains an alternating current without the use of permanent magnets and avoids the waste and inefficiencies of translational to rotational motion conversion.

Although previous linear alternators may be used generally satisfactorily for the alternating current generating applications for which they are designed, the problems noted above may limit their desirability in other applications. In particular, the present invention uses a pair of reciprocating members directly connected to a free-piston stirling engine. The reciprocating members are provided with staggered magnetically conductive or ferromagnetic portions for selectively and alternatingly closing one of a plurality of magnetic circuits. Thus, the use of expensive permanent magnets as needed by prior art linear alternators is avoided.

In addition, the linear alternator of the present invention eliminates permanent magnets without increasing the mass or complexity of the reciprocating element. Although the overall unit weight and unit volume are not reduced compared to permanent magnet linear alternators in the prior art, the overall weight and size penalty is not of particular interest for terrestrial applications. In such applications, the overall system cost can be much more important, as the device must compete with other more conventional sources of electrical energy. Of course, this weight and size increase does not preclude the application of the present invention to non-terrestrial applications where the advantages of this invention may offset other perceived disadvantages.

More particularly, this invention discloses a linear alternator for generating an alternating electrical current, comprising a substantially stationary exciter coil as a magnetic field generator, an inductive output coil and a pair of reciprocating elements that serve to modulate the B-field in the stator. The reciprocating elements each have staggered magnetically conductive or ferromagnetic portions that alternatively close one of a plurality of substantially stationary magnetic circuits. These alternative magnetic circuits, each passing through the center axis of the inductive output coil, are caused to alternatively reverse the direction of magnetic flux flow through the center axis. Thus, the alternating magnetic flux flow through the inductive coil generates an alternating inductive coil output current.

In operation, the magnetically conductive portions of the reciprocating members cause the B-field to shift between one of a plurality of selectable magnetic circuit paths so as to commutate the magnetic flux field strength between a maximum positive (+Bx) and a maximum negative (−Bx) value as a function of the position of the reciprocating element. The B-field goes to zero along the center axis of the inductive coil when the reciprocating elements are at the mid-stroke position. Accordingly, the magnetically conductive portions experience a full oscillation of the B-field from +Bx to −Bx. In so doing, the full capability of the magnetically conductive material is used and thereby results in a magnetically conductive material volume of only half of that compared to conventional variable reluctance generators in use employing a magnetic flux excursion of only 0 to +Bx.

As a further improvement, the total B-field strength remains relatively constant throughout the reciprocating cycle of the reciprocating members since an increase of flux in the first of the plurality of flux paths is balanced by a decrease of flux in the alternate flux path. Thus, reduction of the overall variation of the field flux intensity is beneficial as a widely oscillating field flux at fringe locations can increase hysteresis or eddy current losses and dissipation.

Figure 1:
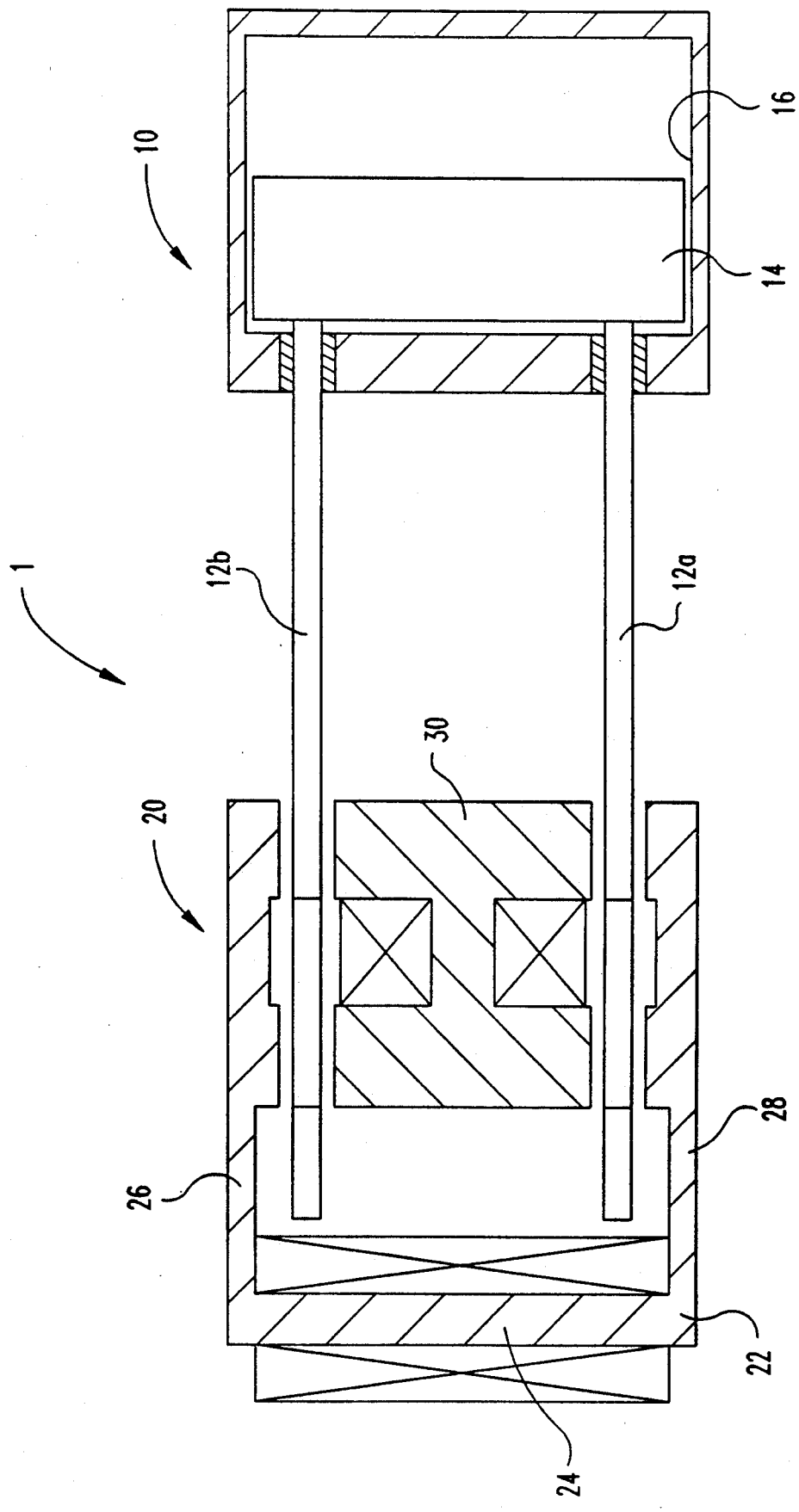
FIG. 1 is an overall schematic of an application of the linear alternator for generating an alternating electrical current according to the present invention, showing the linear alternator and a representational free-piston stirling engine.

It should be understood that the drawings are not necessarily to exact a scale and that certain aspects of the embodiments are illustrated by graphic symbols, schematic representations and fragmentary views. It should also be understood that when referring to physical relationships of components by terms such as "upper", "lower", "upward", "downward", "vertical", "horizontal", "left", "right" or the like, such terms have reference solely to the orientation depicted in the drawings. Actual embodiments or installations thereof may differ.

While such mechanical detail, including other plan and section views of the particular embodiment depicted have been omitted, such detail is not per se part of the present invention and is considered well within the comprehension of those skilled in the art in the light of the present disclosure. The resulting simplified presentation is believed to be more readable and informative and readily understandable by those skilled in the art. It should also be understood, of course, that the invention is not limited to the particular embodiment illustrated.

DETAILED DESCRIPTION OF THE PREFERRED EMBODIMENTS

Referring to the figures, wherein like reference characters designate like or corresponding parts throughout the views, FIG. 1 illustrates the overall configuration and application of an alternating current generating system 1 employing the linear alternator 20 according to the preferred embodiment of this invention. The linear alternator 20 is operatively connected to a reciprocating free-piston stirling engine 10, shown representationally in FIG. 1, which operates according to well-known thermodynamic principles. Preferably, the free-piston stirling engine 10 is supplied with energy from a solar source, for example, with the use of a focusing element (not shown). Of course, other heat energy sources, such as the combustion of fossil fuels, can be advantageously employed.

As can be readily observed in FIG. 1, a free-piston 14 reciprocates within a cylinder 16. Attached to the free-piston 14 are a pair of reciprocating members 12a and 12b. The reciprocating members 12a and 12b are arranged in parallel fashion and extend from the free-piston stirling engine 10 to the linear alternator 20.

Figure 2:
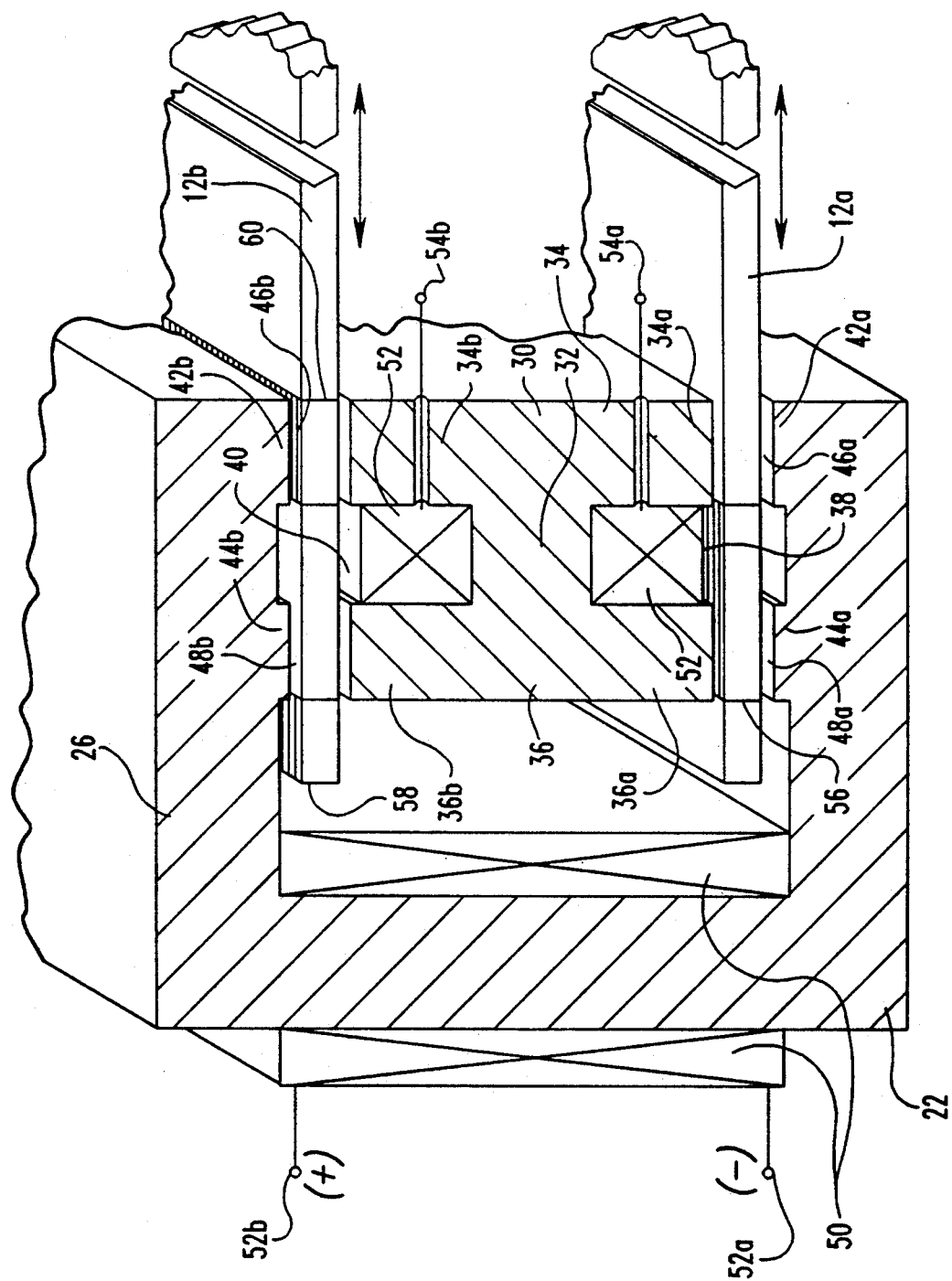
FIG. 2 is a generalized sectional view of the linear alternator for generating an alternating electrical current according to the present invention, showing the magnetically conductive stator, stationary field source, inductive output coil, and reciprocating elements.

Shown in greater detail in FIG. 2, the linear alternator 20 includes a stator body 22, fabricated from suitable magnetically conductive or ferromagnetic materials, such as iron or an iron impregnated matrix. The stator body 22 is generally defined by a vertical section 24, preferably about 10.5 cm in length, and two parallel horizontal sections 26 and 28, each preferably about 10 cm in length and about 2 cm in width, which extend perpendicularly from the respective ends of the vertical section 24. This arrangement yields a "C" shaped structure, which significantly defines a stationary portion of the magnetic circuit.

Centrally located between each distal end of the horizontal sections 26 and 28 is a relatively stationary stator core 30. The stator core 30 generally consists of a horizontally oriented center segment 32, preferably of about 2 cm length and about 2 cm width, arranged between a vertically oriented exterior segment 34 and a vertical oriented interior segment 36, each of about 6 cm in height and about 2 cm in width. The distal ends 34a and 36a, of the segments 34 and 36, respectively, are separated by a slot 38, preferably about 2 cm square. Similarly, the distal ends 34b and 36b of the segments 34 and 36 are separated by a slot 40 of similar size. The stator core, also constructed of a suitable magnetically conductive material, thus assumes an overall cross-sectional configuration resembling an "H". This arrangement will be discussed subsequently as defining at least two selectable magnetic circuit paths constituting an important aspect of the present invention.

Arranged about the vertical section 24 is a magnetic field generating coil 50. The coil 50 is so situated that its central axis is coincident with the center of the vertical section 24. The field generating coil 50 is preferably comprised of about 3050 turns of electrically conductive material, such as copper, sized to correspond to #26 AWG wire, resulting in an operative power loss of about 120 watts. The field generating coil 50, capable of accepting up to one ampere, is preferably excited by a 12 volt DC potential. This particular voltage is generally readily available, for example, from a battery storage element, and is easily compatible with many various control system circuits. Energization of the field generating coil 50 by a DC voltage applied to the terminals 52a and 52b results in a generally constant magnetic flux field through the relatively stable magnetic circuit formed by the stator body 22 and a modulating flux field through a plurality of selectable magnetic circuit paths formed by the stator core 30.

An inductive coil 52 is wound about the stator core 30 within the slots 38 and 40 so that its central axis is coincident with the center of the horizontal center segment 32. Energization of the field generating coil 50 results in the generally stable magnetic circuit path through the stator body 22 and the selectable magnetic circuit paths through the stator core 30, which in turn induces an electrical current to flow through the central axis of the inductive coil 52 according to Faraday's law, as will be discussed below. Output terminals 54a and 54b extending from the inductive coil 52 are provided to complete an output electrical circuit. The inductive coil 52 is preferably comprised of about 250 turns of #16 AWG copper wire, generating an operative power loss of about 250 watts.

In further detail of the stator body 22, the two parallel horizontal sections 26 and 28, extending perpendicularly from the section 24, are provided with nodes 42a, 42b, 44a and 44b. These nodes are arranged to vertically align, respectively, with the ends 34a, 34b, 36a, and 36b of the segments 34 and 36, as shown. Separating the nodes 42a, 42b, 44a and 44b and segment ends 34a, 34b, 36a, and 36b are air gaps 46a, 46b, 48a, and 48b, respectively. The air gaps 46a and 48a form an aperture in the linear alternator 20 for receiving the reciprocating member 12a, as shown in FIG. 2. Similarly, the air gaps 46b and 48b form an aperture in the linear alternator 20 for receiving the reciprocating member 12b.

Figure 3B:
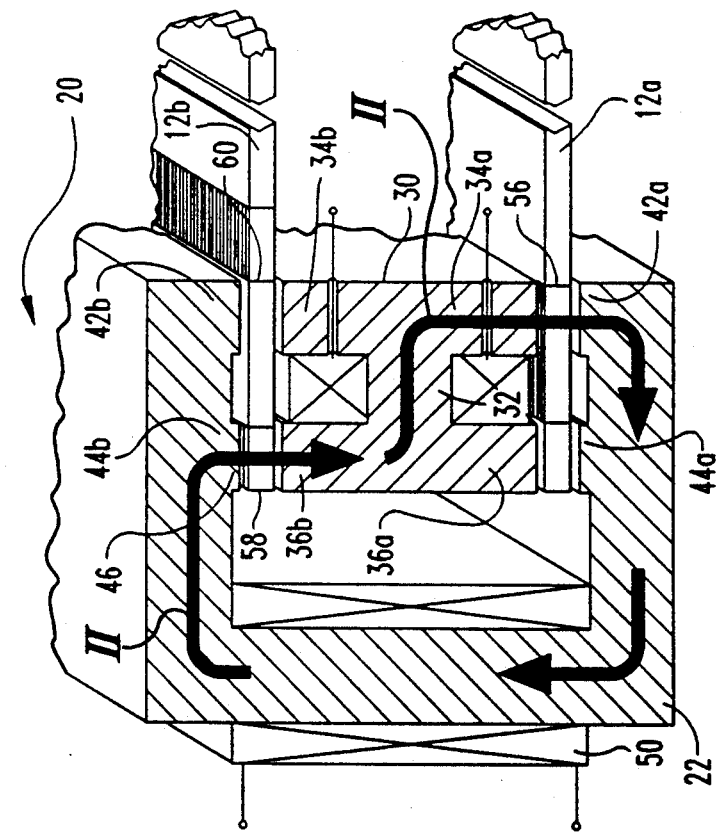
FIG. 3b is a sectional view of the linear alternator for generating an alternating electrical current according to the present invention shown in FIG. 2, where the reciprocating elements are located so as to obtain the maximum −Bx field.
Figure 3A:
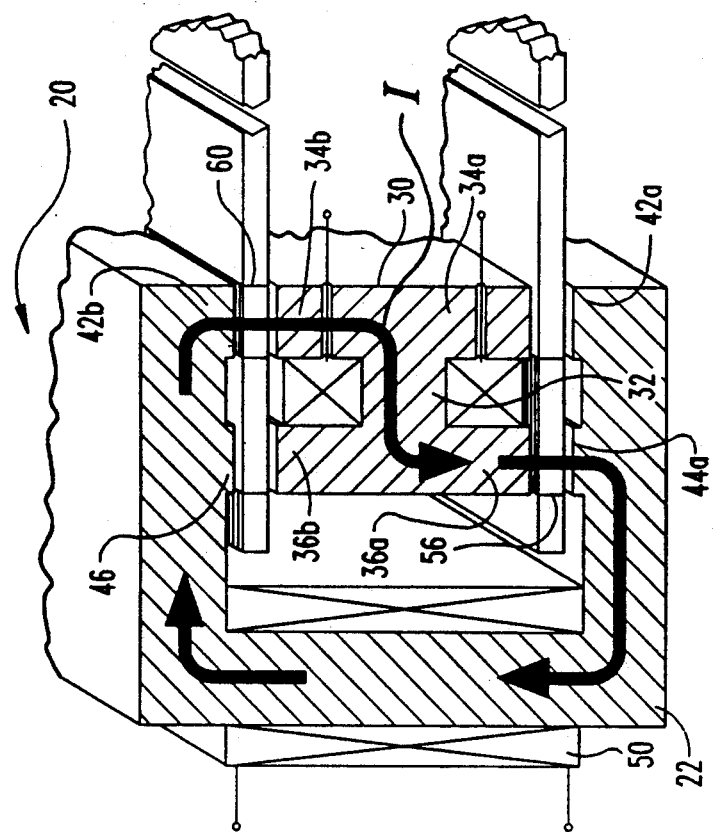
FIG. 3a is a sectional view of the linear alternator for generating an alternating electrical current according to the present invention shown in FIG. 2, where the reciprocating elements are located so as to obtain the maximum +Bx field.

The reciprocating members 12a and 12b are generally constructed of non-magnetically conductive or non-ferromagnetic material, with discrete magnetically conductive laminated regions 56, 58 and 60. Each of the laminated regions 56, 58 and 60 are preferably constructed by arranging vertically oriented layers of 14 mil Hypersil (or 48 percent nickel-iron alloy) extending through the entire vertical thickness of the reciprocating members 12a and 12b. As shown in FIGS. 2, 3a and 3b, the laminated region 56 is located on the reciprocating member 12a such that the left border of the laminated region 56 is located about 2 cm from the distal left end of the reciprocating member 12a. The laminated region 56 extends in the rightward direction along the length of the reciprocating member 12a for about 4 cm.

Conversely, the laminated regions 58 and 60 are located on the reciprocating member 12b. The left border of the laminated region 58 defines the distal left end of the reciprocating member 12b and extends toward the right for about 2 cm. Spaced about 4 cm from the right border of the laminated region 58 is the left border of the laminated region 60. The laminated region 60 is also about 2 cm in length. The zone separating the laminated regions 58 and 60 along the length of the reciprocating member 12b is constructed of non-magnetically conductive or non-ferromagnetic material. Note that lengths of the laminated regions 56, 58 and 60 are related to the stroke of the reciprocating elements 12 and 12b.

In operation, as best viewed in FIGS. 3a and 3b, the linear alternator 20 according to the present invention can be viewed in its two extreme operative conditions. In FIG. 3a, the reciprocating members 12a and 12b, operating in unison, are displaced to the far left, reflecting the motion of the piston 14 to the bottom-dead center position in the chamber 16. Because the field generating coil 50 is excited, a magnetic circuit is generated through the magnetic circuit path I. This path includes the stationary magnetic circuit elements generally defined by the stator body 22, which include the vertical section 24 and the two horizontal sections 26 and 28, as seen in FIG. 2. The magnetic circuit path I also includes one of a plurality of the selectable magnetic circuit paths operatively circulating through the stator core 30 and portions of the stator body 22. The selectable magnetic circuit path corresponding to magnetic circuit path I includes the node 42b, the laminated region 60, the end segment 34b, the center segment 32 (in the leftward direction), the end segment 36a, the left portion of the laminated region 56, and the node 44a.

In FIG. 3b, the reciprocal members 12a and 12b have been displaced to the far right, reflecting the motion of the piston 14 to the top-dead center position in the chamber 16. The magnetic circuit now generated will transverse through the magnetic circuit path II. This path also includes the stationary magnetic circuit elements generally defined by the stator body 22. However, the magnetic flux path II now includes a second of a plurality of selectable magnetic circuit paths operatively circulating through the stator core 30 and portions of the stator body 22. The selectable magnetic circuit path corresponding to magnetic circuit path II includes the node 44b, the laminated region 58, the end segment 36b, the center segment 32 (in the rightward direction), the end segment 34a, the right portion of the laminated region 56, and the node 42a.

By comparing the direction of the magnetic flux field flow of the magnetic circuit paths I and II through the center section 32 as shown in FIGS. 3a and 3b, it can be seen that the direction of the magnetic flux field flow goes through a 180 degree reversal. This magnetic flux field flow direction reversal, operating along the center axis of the inductive coil 52, is effective to reverse the direction of the flow of the induced output electric current through the inductive coil 52 and output terminals 54a and 54b for every half cycle of the reciprocating members 12a and 12b and the free-piston stirling engine 10. Accordingly, by properly establishing the stroke and operating speed of the free-piston stirling engine, an alternating current can be generated in the inductive coil 52 for useful applications.

Note that eight air gaps, four air gaps defined by the insertion of reciprocating member 12a into the air gaps 46a and 48a and four air gaps defined by the insertion of reciprocating member 12b into the air gaps 46b and 48b, must be transversed by the magnetic field flux. Typically, the preferable ratio of the distances of each of these air gaps to the thickness of the corresponding laminated region is 1:25. The thickness of the laminated regions 56, 58 and 60 are determined by the ratio of the coupled to uncoupled flux within the stator 22, and the minimum air gap that can be economically manufactured. The width of the laminated regions 56, 58 and 60 mounted on the reciprocating elements 12a and 12b is determined by the length of stroke of the piston 14.

It can be readily appreciated that the voltage of this invention can be linearly controlled by varying the field current applied to the field generating coil 50 (up to the point of stator 22 saturation). By doing so, the power available from the generation of the alternating current can be controlled without necessarily varying the stroke of the engine 10 and the attached reciprocal elements 12a and 12b. This is a significant advantage for any application utilizing free-piston stirling engines, as the efficiency of a free-piston stirling engine can be very dependent on the piston stroke. Further, the invention as described above eliminates the necessity for an external motorized transformer unit to control the power generated by the alternating current as extracted from the engine. For grid-connected systems, the elimination of these external motorized transformer units can represent up to a 36 percent savings of the total control system costs. Finally, it should be appreciated that multiple field generating coils 50, inductive coils 52 or pairs of the reciprocating members 12a and 12b can be advantageously combined to form an alternating current generator of greater power output capabilities or multi-phase capabilities.

It will be understood that the details, materials and arrangements of parts of specific embodiments have been described and illustrated to explain the nature of the invention. Changes may be made by those skilled in the art without departing from the invention as expressed in the appended claims.

What is claimed is:

1. A device for generating an alternating electrical current comprising:
    a magnetically conductive stator forming a magnetic circuit,
    a magnetic field exciter coil responsive to an input electrical current for providing a magnetic flux field,
    an inductive output coil defining an electrical circuit having an electrical current induced by alternation of said magnetic flux field, and
    at least two reciprocating elements having at least a first and second position, one reciprocating element having at least one magnetically conductive region and the other of said reciprocating elements having at least two magnetically conductive regions;
    said reciprocating elements moving to said first position to form a first magnetic circuit and causing an induced electrical current in said inductive output coil having a maximum positive value, and said reciprocating elements moving to said second position to form a second magnetic circuit and causing an induced electrical current in said inductive output coil having a maximum negative value.

2. The invention of claim 1, wherein said magnetic field exciter coil and said inductive output coil are stationary relative to said stator.

3. The invention of claim 1, wherein said stator comprises a body portion and a core portion, said body portion substantially forming a stable portion of said first and second magnetic circuits and said core portion substantially forming a selectable portion of said first and second magnetic circuits.

4. The invention of claim 3, wherein said magnetic field exciter coil is disposed about a section of said body portion.

5. The invention of claim 3, wherein said inductive output coils is disposed about a section of said core portion.

6. The invention of claim 1, wherein said inductive output coil having a central axis coinciding with each of said first and second magnetic circuits and motion of said reciprocating elements reversing the direction of said magnetic flux field flow through said central axis of said inductive output coil to generate an alternating current within said inductive output coil.

7. The invention of claim 1, wherein each of said reciprocating elements has an axial portion generally constructed of non-magnetically conductive material and said magnetically conductive regions being located at positions along said axial portion to complete said first or second magnetic circuit depending upon the position of said reciprocating elements.

8. The invention of claim 7, wherein said magnetically conductive regions of said reciprocating element having at least two magnetically conductive regions are separated by a magnetically non-conductive region such that said magnetically conductive regions of said reciprocating elements are staggered,
    reciprocation of said reciprocating elements being effective to alternate said magnetic flux field between said first and second magnetic circuits by alternatively introducing into each of said magnetic circuits said staggered magnetically conductive regions, the direction of magnetic flux field flow through said inductive output coil being thereby reversed and inducing an alternating electrical current through said inductive output coil.

9. The invention of claim 1, wherein said magnetic flux field formed by said stationary field exciter coil is responsive to fluctuation of said input electrical current, said alternating current generated by said inductive output coil disposed within said magnetic flux field being responsive to fluctuation of said magnetic flux field.

10. The invention of claim 1, wherein reciprocation of said reciprocating elements from said first and second positions within a relatively constant magnitude magnetic flux field defined by said magnetically conductive stator and said magnetically conductive regions of said reciprocating elements reduces the overall variation of said magnetic field flux in said stator by alternating said induced electrical current from a maximum positive value to a maximum negative value.

11. A device for generating an alternating electrical current comprising:
    a magnetically conductive stator forming a magnetic circuit having a first member and a second member,
    said stator having an electrical winding about said first member responsive to an input field current for generating a magnetic flux field through said stator, and
    said stator further having an inductive output coil about said second member, said inductive output coil having a central axis and defining an electrical circuit;
    said magnetic flux field through said stator substantially coinciding with said central axis of said inductive output coil to alternately complete at least a first magnetic circuit and a second magnetic circuit, and
    at least two reciprocating elements having specific regions of magnetically conductive material and having at least a first and second position to alternatingly form operative elements of said first magnetic circuit and said second magnetic circuit;
    said reciprocating elements establishing said first magnetic circuit and said second magnetic circuit by alternating between said first and second positions and alternatingly introducing into said first magnetic circuit and said second magnetic circuit said magnetically conductive regions so as to reverse the direction of magnetic flux field flow through said central axis of said inductive output coil to generate an alternating electrical current within said inductive output coil.

12. The invention of claim 11, wherein said alternating electrical current induced in said inductive output coil varies from a maximum positive value to a maximum negative value by completely reversing the direction of magnetic flux field flow through said central axis of said inductive output coil.

13. The invention of claim 11 wherein said reciprocating elements are separated by said second member, said first and said second members having a plurality of air gaps, each of said air gaps defining translational apertures within which said reciprocating elements are reciprocated between said first and second positions;

said reciprocating elements being generally constructed of a non-magnetically conductive material;

one of said reciprocating elements having at least two regions of magnetically conductive material being located at positions along an axial portion and a second of said reciprocating elements having at least one region of magnetically conductive material, a portion of said magnetically conductive regions cooperating to operatively form a portion of one of said magnetic circuits, each of said regions of magnetically conductive material of each of said reciprocating elements being axially staggered relative to each other; and said reciprocating elements moving between said first and second positions within said apertures to alternatingly establish said first and second magnetic circuits by cooperatively introducing into said air gaps said regions of magnetically conductive material to generate an alternating electrical current.

14. The invention of claim 13, wherein the magnetic flux field of said magnetic flux circuit within said first member experiences a full oscillation from a maximum positive value to a maximum negative value in response to the motion of the reciprocating elements between said first position and said second position.

15. A device for generating an alternating electrical current, comprising:

a magnetically conductive stator further comprising a body portion and a core portion, said body portion and core portion cooperating to establish a first and a second magnetic circuit;

said body portion adapted to operatively accept an input electrical winding responsive to an input electric current to generate a linearly variable magnetic flux field through said stator;

said core portion adapted to accept an inductive output coil having a central axis and defining an electrical circuit;

said core portion arranged so that said first and second magnetic circuits pass through said core portion to substantially coincide with said central axis of said inductive output coil;

said body portion and said core portion being separated by a plurality of air gaps, each of said air gaps forming translational apertures within which at least two reciprocating elements may be reciprocated;

said reciprocating elements having at least a first and second position;

said reciprocating elements having an axial portion being generally constructed of a non-magnetically conductive material, and a first of said reciprocating elements having at least two magnetically conductive regions and a second of said reciprocating elements having at least one magnetically conductive region located at positions along the axial portion of said reciprocating elements alternatingly establishing said first magnetic circuit and said second magnetic circuit, each of said magnetically conductive regions of each of said reciprocating elements being axially staggered relative to each other; and said reciprocating elements moving within said apertures to establish said first and second magnetic circuits by introducing into said air gaps said magnetically conductive regions to alternately reverse the direction of magnetic flux flow through said central axis of said inductive coil to generate an alternating electrical current.

16. A device for generating an alternating electrical current comprising:

an electrical winding for providing a magnetic flux field source, a magnetically conductive stator having at least two magnetic circuits, an inductive output coil having a central axis, and at least two reciprocating elements;

said stator further comprising a first member and a second member, said second member substantially forming a first and a second magnetic circuit;

said electrical winding being positioned with respect to said stator for generating a linearly variable magnetic flux field through each of said first and second magnetic circuits;

said stator being further adapted to operatively accept said inductive output coil about said second member, said magnetic flux field passing through said central axis of said inductive output coil for both said first and second magnetic flux circuits;

said first member further having at least two sets of polar regions and said second member further having at least two sets of corresponding polar regions, wherein each of said first member polar regions and each of said second member polar regions are located proximate its oppositely polarized corresponding polar region and separated by a plurality of air gaps;

said air gaps defining translational apertures within which said reciprocating elements may be moved between a first and second position;

said reciprocating elements having an axial portion and each generally constructed of non-magnetically conductive material;

one of said reciprocating elements comprised of two magnetically conductive regions and a second of said reciprocating elements having one magnetically conductive region, said conductive regions being staggered along the axial portion of said reciprocating elements, said reciprocating elements alternatingly establishing a portion of one of said first and second magnetic circuits; and translation of said pair of reciprocating elements between said first and second positions being effective to alternatingly align said magnetically conductive regions with alternatively one polar region of said first member polar regions and with an oppositely polarized polar region of one polar region of said second member polar regions to establish said first or second magnetic circuits and to alternately reverse the direction of magnetic flux field flow through said central axis of said inductive output coil to generate an alternating electrical current.

17. The invention of claim 16, wherein said first member forms a generally fixed magnetic circuit and said second section forms a portion of said first and second magnetic circuits, reciprocation of said reciprocable elements being effective to alternate the direction of magnet flux field flow through said second member and said central axis of said inductive output coil to generate an alternating electrical current.

18. A method for generating an alternating electrical current using an alternator having a magnetically conductive stator with at least a first and second selectable magnetic circuit, a stationary field exciter coil for establishing a magnetic flux field, an inductive output coil operatively responsive to changes in said magnetic flux field, and at least two reciprocating elements having magnetically conductive regions alternatingly establishing said first or second magnetic circuits; said method comprising the steps of:

applying a field voltage source to said stationary field exciter coil, and alternating translating said magnetically conductive regions of said reciprocating elements between said first and second magnetic circuits in said stator to substantially reverse the direction of flow of said magnetic flux field in the proximity of said inductive output coil to induce an alternating electrical current varying from a maximum positive value to a maximum negative value.

19. The method of claim 18, wherein said amplitude of said induced alternating current is linearly modulated by controlling the field voltage source applied to said stationary field exciter coil to linearly vary the intensity of the magnetic flux field.

20. The method of claim 18, wherein said inductive coil has a central axis and each of said first and second magnetic circuits coincide with said central axis, and said magnetic flux field passing through said magnetic circuits alternating in direction by the alternating translation of said magnetically conductive regions of said reciprocating elements.

21. An alternating current generating system comprising:

a stirling engine having a cylinder and a free piston adapted for reciprocal movement within said cylinder;

a linear alternator having a magnetically conductive stator forming a magnetic circuit, a magnetic field exciter coil responsive to an input electrical current for providing a magnetic flux field, an inductive output coil defining an electrical circuit having an electrical current induced by alternation of said magnetic flux field, and at least two reciprocating elements having at least a first and second position, one reciprocating element having at least one magnetically conductive region and the other of said reciprocating elements having at least two magnetically conductive regions;

said reciprocating elements adapted for movement in conjunction with said piston of said stirling engine to said first position to form a first magnetic circuit and causing an induced electrical current in said inductive output coil having a maximum positive value, and said reciprocating elements moving to said second position to form a second magnetic circuit and causing an induced electrical current in said inductive output coil having a maximum negative value.

* * * * *